(12) United States Patent
Katz et al.

(10) Patent No.: US 8,583,474 B2
(45) Date of Patent: Nov. 12, 2013

(54) SYSTEM AND METHOD FOR PROVIDING RELATIVE PRICE POINT INCENTIVES BASED UPON PRIOR CUSTOMER PURCHASE BEHAVIOR

(75) Inventors: Gary M. Katz, Northbrook, IL (US); Ryan Carr, South Elgin, IL (US); Angela Clemens Kimes, St. Louis, MO (US)

(73) Assignee: Catalina Marketing Corporation, St. Petersburg, FL (US)

( * ) Notice: Subject to any disclaimer, the term of this patent is extended or adjusted under 35 U.S.C. 154(b) by 3359 days.

(21) Appl. No.: 10/498,003

(22) PCT Filed: Mar. 7, 2002

(86) PCT No.: PCT/US02/06861
§ 371 (c)(1),
(2), (4) Date: Jun. 14, 2004

(87) PCT Pub. No.: WO03/079260
PCT Pub. Date: Sep. 25, 2003

(65) Prior Publication Data
US 2005/0086101 A1    Apr. 21, 2005

(51) Int. Cl.
*G06Q 30/00*    (2012.01)
(52) U.S. Cl.
USPC ........................................................ 705/14.1
(58) Field of Classification Search
USPC .................................................. 705/14, 14.1
See application file for complete search history.

(56) References Cited

U.S. PATENT DOCUMENTS

| | | | |
|---|---|---|---|
| 5,974,399 A | | 10/1999 | Giuliani et al. |
| 6,055,573 A | * | 4/2000 | Gardenswartz et al. ...... 709/224 |
| 6,061,660 A | | 5/2000 | Eggleston et al. |
| 6,185,541 B1 | | 2/2001 | Scroggie et al. |
| 2001/0014868 A1 | * | 8/2001 | Herz et al. ...................... 705/14 |
| 2001/0047296 A1 | | 11/2001 | Wyker |
| 2001/0051895 A1 | | 12/2001 | Guiliani et al. |
| 2002/0046082 A1 | | 4/2002 | White |
| 2007/0150354 A1 | * | 6/2007 | Walker et al. ................... 705/14 |

FOREIGN PATENT DOCUMENTS

| WO | WO 98/21713 | 5/1998 |
|---|---|---|
| WO | WO 99/12117 | 3/1999 |

OTHER PUBLICATIONS

Jul. 22, 2005, EPO Supplementary European Report EP 02709798.
Sep. 18, 2002, PCT International Search Report for PCT/US02/06861.

* cited by examiner

*Primary Examiner* — Daniel Lastra
(74) *Attorney, Agent, or Firm* — Pillsbury Winthrop Shaw Pittman LLP (57) ABSTRACT

The invention provides a system, computer program, and method for generating price point based incentives comprising: determining a category specific price point (620) associated with a dominant competitive brand and a client brand; generating an incentive (630) for said client brand based upon said price point and an anticipated price differential (640).

1 Claim, 6 Drawing Sheets

| Store ID | Cust ID | Trans Date | Lane | UPC 1 | P1 | UPC 2 | P 2 |
|---|---|---|---|---|---|---|---|
| 21 | 35 | 990114 | 1 | 1 | 0.74 | 1 | 1.14 |
| 21 | 35 | 990121 | 7 | 2 | 0.74 | 0 | 1.12 |

| Store ID | Cust ID | Trans Date | Lane | First UPC | | | Second UPC | | |
|---|---|---|---|---|---|---|---|---|---|
| 21 | 35 | 990114 | 1 | UPC11 | 1 | 0.74 | UPC14 | 1 | 1.10 |
| 21 | 35 | 990121 | 7 | UPC82 | 2 | .30 | UPC10 | 3 | 0.47 |

| Store ID | Cust ID | Trans Date | Lane | Product Data |
|---|---|---|---|---|
| 21 | 35 | 990114 | 1 | UPC 17, 1, 0.57; UPC 47, 3, 1.17;.... |
| 21 | 35 | 990121 | 7 | UPC 81, 7, 1.15;..... |

SYSTEM AND METHOD FOR PROVIDING RELATIVE PRICE POINT INCENTIVES BASED UPON PRIOR CUSTOMER PURCHASE BEHAVIOR

This patent is a 371 national stage entry of PCT application PCT/US02/06861, filed Mar. 7, 2002.

BACKGROUND OF THE INVENTION

1. Field of the Invention

This invention relates to the field of marketing. More specifically, this invention relates to the field of marketing consumer goods.

2. Discussion of the Background

Point of sale (POS) computer systems function to account for transactions at POS terminals. POS systems typically include a database management system including a product price look-up table which is accessed by the POS terminal during a transaction. POS systems retrieve to the POS terminal data defining the prices of items for which a consumer requests purchase. POS systems total the costs for all of those items. POS systems log the purchase of the items. Some POS systems log the purchase of items in transaction records also including a unique customer identification (CID) associating that CID with the items purchased, the price of the items purchased, and the quantity of each product item purchased, the date of purchase, and the lane (POS terminal identification) in which the purchase occurred.

The present inventors recognize that the data stored in some POS computer systems can beneficially be used to determine purchase incentives that would induce customers to purchase certain products, as indicated below.

SUMMARY OF THE INVENTION

It is an object of this invention to determine purchase incentives sufficient to induce customers to purchase products upon which the incentives are offered.

It is another object of this invention to provide those purchase incentives to the customers.

BRIEF DESCRIPTION OF THE DRAWINGS

These and other objects of the invention are explained in more detail below with reference to the following figures.

DETAILED DESCRIPTION OF EMBODIMENTS OF THE INVENTION

Figure 1:
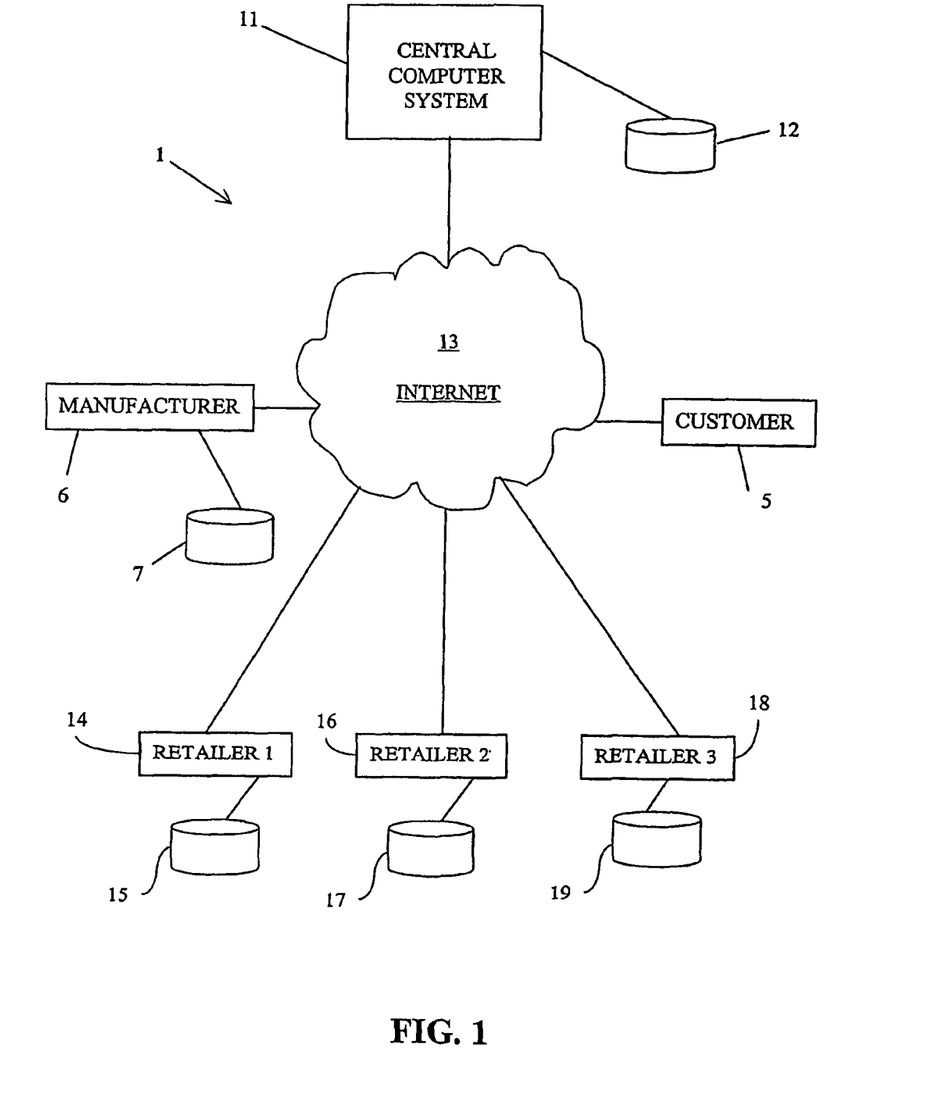
FIG. 1 is a schematic showing a network computer system for performing the present invention.

FIG. 1 shows a computer network system 1. System 1 preferably includes central computer system 11, central database 12, Internet 13, retailer1 computer system 14, retailer1 database 15, retailer2 computer system 16, retailer2 database 17, retailer3 computer system 18, and retailer3 database 19.

In addition, system 1 may include customer computer 5, manufacturer computer system 6, and manufacturer database 7.

While shown with one central computer system and three retailer computer systems, the present invention may also function with either a single computer system performing all of the functions that are specified below or the single central computer system 11 and a single retailer computer system (one of 14, 16, 18).

Each of the noted computer systems 6, 11, 14, 16, and 18 preferably include hardware and software enabling them to exchange data via the Internet 13. Each of the aforementioned computer Systems is indicated as connected to Internet 13 via a communication line. The communication lines may be electrical, optical, or wireless based lines. The data communication need not be over the Internet.

Each of the databases 7, 12, 15, 17, and 19 preferably are relational computer database systems in which data is stored in sets of fields associated with one another, referred to as records, and in which data of the same type, e.g., field, is stored in a common format and in association with a field name. Field names are optional. Each set of records and fields having the same types of associations is called a table. Each of the aforementioned databases may have a plurality of tables. Each of those tables may include one or more fields the concatenation of which provides a unique identification of that record in that table. Those unique identifications are referred to as primary keys. Each of the tables may include a field which is a primary key in a different table, which field is referred to in the subject table as a foreign key. Preferably, each of the database management systems includes associated software enabling a plurality of software functions to be performed on the records and tables in the database, including sorting, summing, and selecting, preferably based upon the structured query language (SQL) standard database language.

Each of the aforementioned computer systems preferably includes at least one digital processor and hardware for inputting and outputting data and inputting control signals.

Retailer databases 15, 17, and 19 are each representative of databases of a retailers POS systems. Each one of those databases preferably includes transaction records for transactions recorded by the POS terminals (lanes), in the corresponding retail store or stores. In this regard, each of the retailer computer systems 14, 16, 18, may represent the computer POS system for a single store or a plurality of associated stores.

Central database 12 stores transaction data from various ones of the retailers. The transaction data stored in central database 12 corresponds to transaction data stored in each one of the retailer databases 15, 17, 19.

Figure 2A:
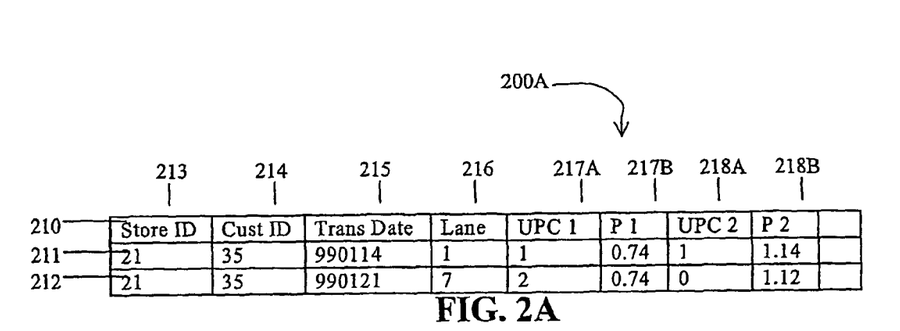
FIG. 2A-2C each schematically show a data structure for records in a central database of a central computer system of the invention.
Figure 2B:
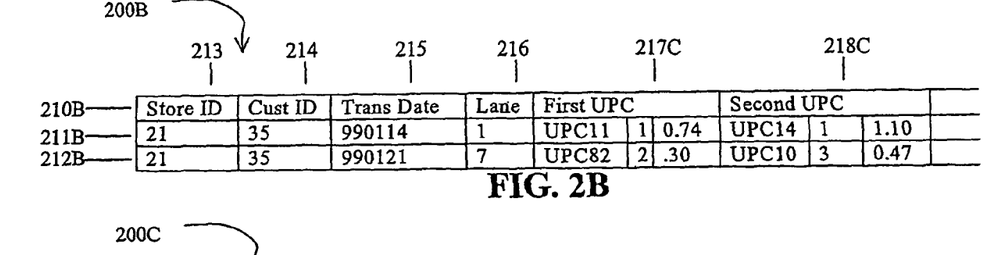
Figure 2C:
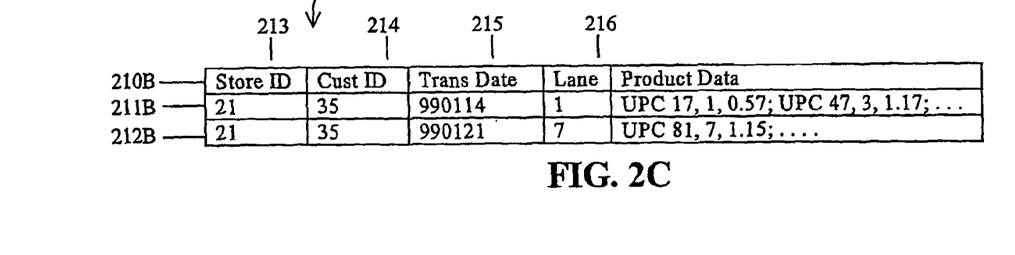

FIGS. 2A-2C illustrate alternative data structures of transaction data records stored in the central database 12.

FIG. 2A shows record format 200 including records illustrated by rows including field name record 210, data record 211, and data record 212. Data structure 200A also shows columns illustrating data fields including the store ID field 213, the customer ID field 214, the transaction date field 215, the lane ID field 216, the UPC1 field 217A, the UPC1 price field 217B, the UPC2 field 218A, and the UPC2 price field 218B. In addition, the data structure 200A would include additional pairs of UPC and price fields for all UPCs corresponding to products sold in the corresponding store or stores controlled by one of the retailer computer systems 14, 16, 18. The UPC1 field stores the number of product items having UPC code UPC1 in the transaction associated with the data record. The UPC1 price field stores a price associated with the UPC1 product items purchased in the transaction; either the per unit price, the average per unit price, or the total price for all product items having UPC code UPC1.

FIG. 2B shows data structure 200B including the same columns 213, 214, 215, and 216 as in FIG. 2A. The data structure in 200B differs from the data structure 200A in the manner in which the product transaction data is stored. Specifically, field 217C stores in a single field a UPC code of a first product purchased, the number of units of that product purchase, and an associated price for the purchase of the units of that product. Field 218C stores UPC code, number of units purchases, and associated price for the next product contained in the same transaction record. Additional fields would contain UPC codes, number of units purchased, and associated price for each of the remaining products contained in the transaction record Elements 210B, 211B, and 212B, correspond to elements 210, 211, and 212, differing only in the naming of the field headings 217C, 218C, and corresponding data for product items contained in the transactions.

FIG. 2C shows data structure 200C presenting yet another means in which the same data shown in the data structures 200A and 200B can be stored. In data structure 200C all data for products purchased, the number of units of the products purchased, and associated prices are stored in a data delimited form in the single data field 217A. In this format, the triplet of product UPC code, number of units purchased, and associated price are separated from the next triplet by a field delimiter, shown here to be a semi colon, and each member of the triplet is separated from one another by another delimiter, shown here to be a comma.

Data records 200A-200C illustrate alternative data structures in which transaction data can be stored. One skilled in data base design will recognize that there are other data structures that may be used to store the same data. In addition, the TransDate field may contain both date and time of day data.

Embodiments of the method of the invention are specified in connection with FIGS. 3-6.

The following definitions are useful in specifying the methods of the invention.

A product or service category as used herein means a group of products or services that have a similar set of characteristics such that they may be considered to provide consumers interchangeable utility. Examples of categories of products are tomato sauce, cold cereal, canned beans, and deodorants.

A purchase cycle is defined herein to mean the average or medium period of time between purchases of products associated with a CID, or a store D and a CID. That is, the average time between purchases of goods associated with either the same consumer or consumers that use the same CID, such as members of a household or family.

A category specific purchase cycle is defined herein to mean the average, median, or range of time centered about either the average or median times between purchase of goods in a specified category in association with a CID, or a store ID and a CID. The category specific purchase cycle is a prediction of the time between when a consumer purchases products from the specified category.

A category specific price point is defined herein to mean a difference in price between two brands of products in the same category at which purchases (by consumers) associated with a CID, or with a store ID and a CID are statistically equally likely to be for either of the two brands of products.

Figure 3:
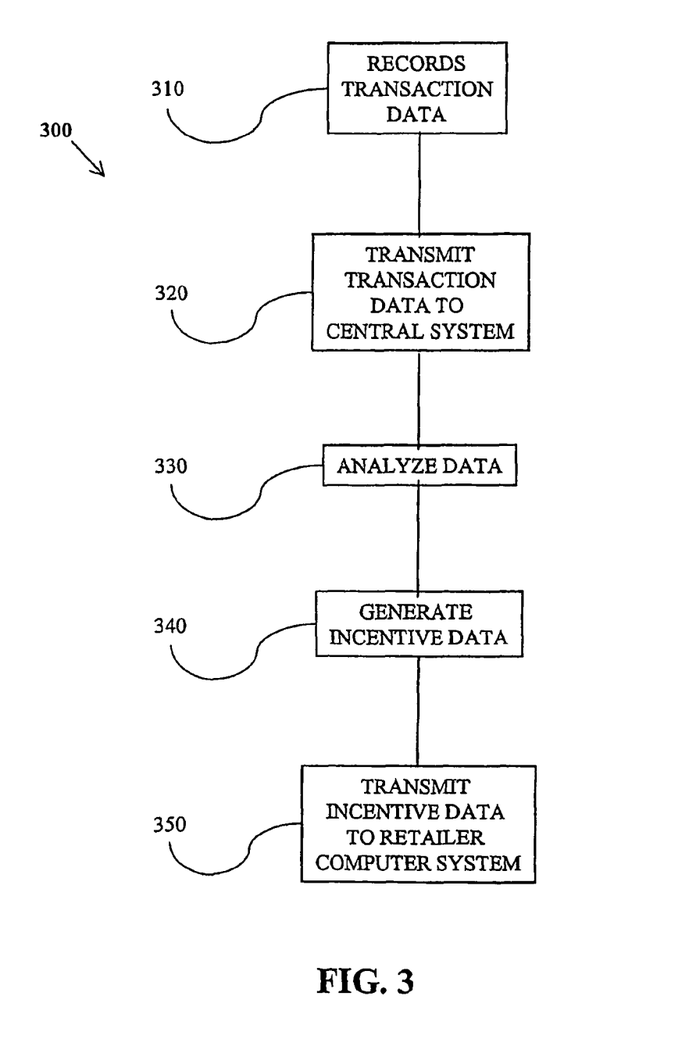
FIG. 3 is a high level flowchart showing high level steps of the invention.

FIG. 3 shows steps involved in recording and analyzing transaction data.

In step 310, a retailer's POS system records transaction data. The transaction data typically includes a customer ID, a transaction date and time, a lane specification, and the UPC codes, number of units of that UPC code that are contained in the trasaction, and the associated price, for each product item in a transaction. Preferably, the transaction record includes a CID.

This invention relates to those transaction records which do include a CID. The transaction record may include a store ID. However, store IDs may be associated with records received by the central computer system 11 when the central computer system receives records from a specified retailer computer system, such as retailer computer systems 14, 16, or 18.

In step 320, a retailer computer system transmits transaction data to the central computer system 11. The central computer system 11 stores that transaction data in the central data base 12.

In step 330, the central computer system 11 analyzes the transaction data. Results of that analysis include records which contain either a CID or a store ID and a CID. Each record also includes data indicating at least one category and an associated category specific price point. Each record preferably also includes at least one of data indicating a purchase cycle and a category specific purchase cycle for the specified category.

In step 340, the central computer system 11 generates incentive data. The incentive data includes data associated with a CID, and preferably data specifying discounts contingent upon the purchase of specified products. Typically, the incentive data is also stored in association with at least one of a store ID and a retailer chain ID.

In step 350, the retail computer system transmits the incentive data relating to transaction data from a specified retail store or association of stores to the corresponding retailer computer system 14, 16, 18 either for one or a plurality of CIDs. Preferably, the corresponding retail computer system stores the incentive data in the corresponding retailer database 15, 17, or 19. However, if the CID relates to a transaction in process, the data may used by the CPU of the retailer computer system or the CPU, if any, of a smart POS terminal, in processing that transaction. Thus, in some embodiments, the incentive data need not be stored in the database 15, 17, 19.

Figure 4:
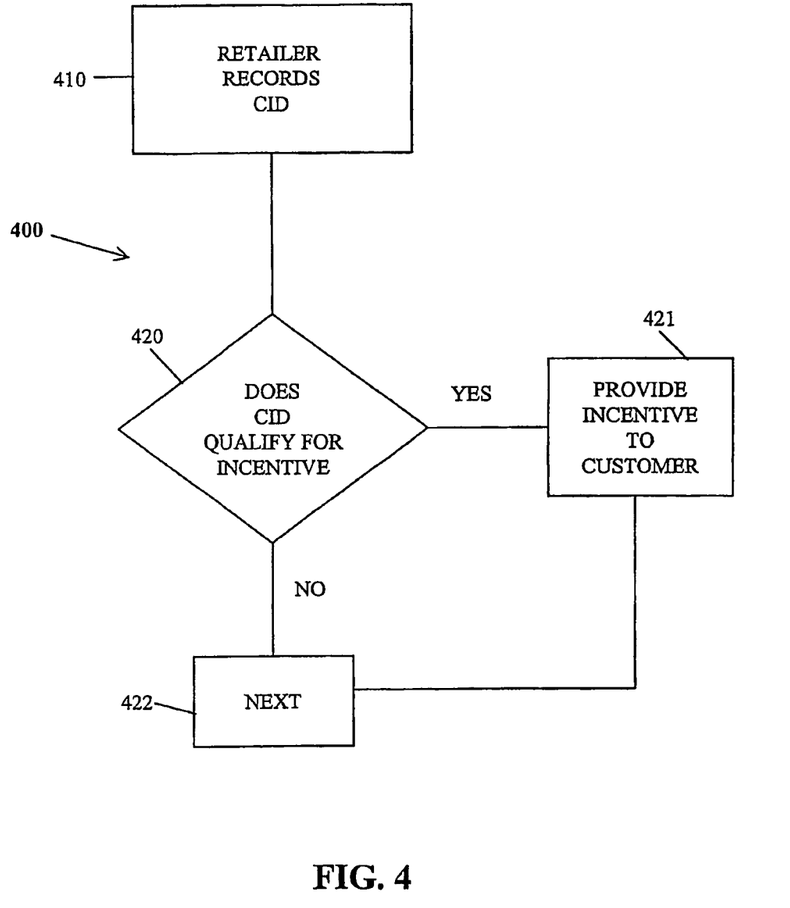
FIG. 4 is a high level flowchart showing steps providing incentives to customers.

FIG. 4 shows steps involved in providing incentives to the customer during a transaction in a retail store. Alternatively, the incentives could be provided via postal mail, via email, or via any other communication medium.

In step 400, the retail computer system 14, 16, or 18, records a CID, preferably at a POS terminal. That recording may occur during a customer's transaction in which the customer is purchasing products. However, the retail computer system may record the customers' CID at any time. For example, the retailer's computer system may record the CID in response to receipt of that CID transmitted from the customer computer 5 over the Internet 13 to the retailer computer system. In addition, one or more CIDs may be transmitted by the manufacturer computer system 6 to any one of the retailer computer systems 14, 16, 18.

Furthermore, either the manufacturer computer system 6 or the customer computer 5 may transmit one or more CIDs and one or more retailer computer system identifications to the central system 11. In response, the central computer system 1 may generate incentive data and transmit the incentive data to the corresponding retailer computer system, or to the manufacturer computer system 6. In addition, the central computer system 11 may transmit the incentive data for a specific consumer (as indicated for example by a CD associated with a network address for the customer's computer 5) to that consumer's customer computer 5. The incentive data may specify, or whichever computer system to which that data is sent may contain means for, printing that data in either or both of machine readable and human readable form. That is, the incentive data may be printed or stored in the form of vouchers or coupons providing discounts to the specified CID for purchases of one or more specified products.

In step 420, the retailer computer system controlling the POS terminal at which the CID has been recorded, typically but not necessarily in association with a purchase transaction at the POS terminal, determines whether the CID qualifies for incentives.

In step 421, assuming the answer to the determination in step 420 was yes, the retailer computer system provides incentive to the customer. The POS terminal or an associated device generates the incentive so that it can be provided to the person holding the CID. It may be the central computer system 11 instead of a retailer computer system which performs step 420 during the customer's transaction.

In step 422, the retailer computer system completes the customer's transaction at the point of sale terminal and awaits the next transaction. This step involves the storing of the customer's transaction record for the current transaction.

Figure 5:
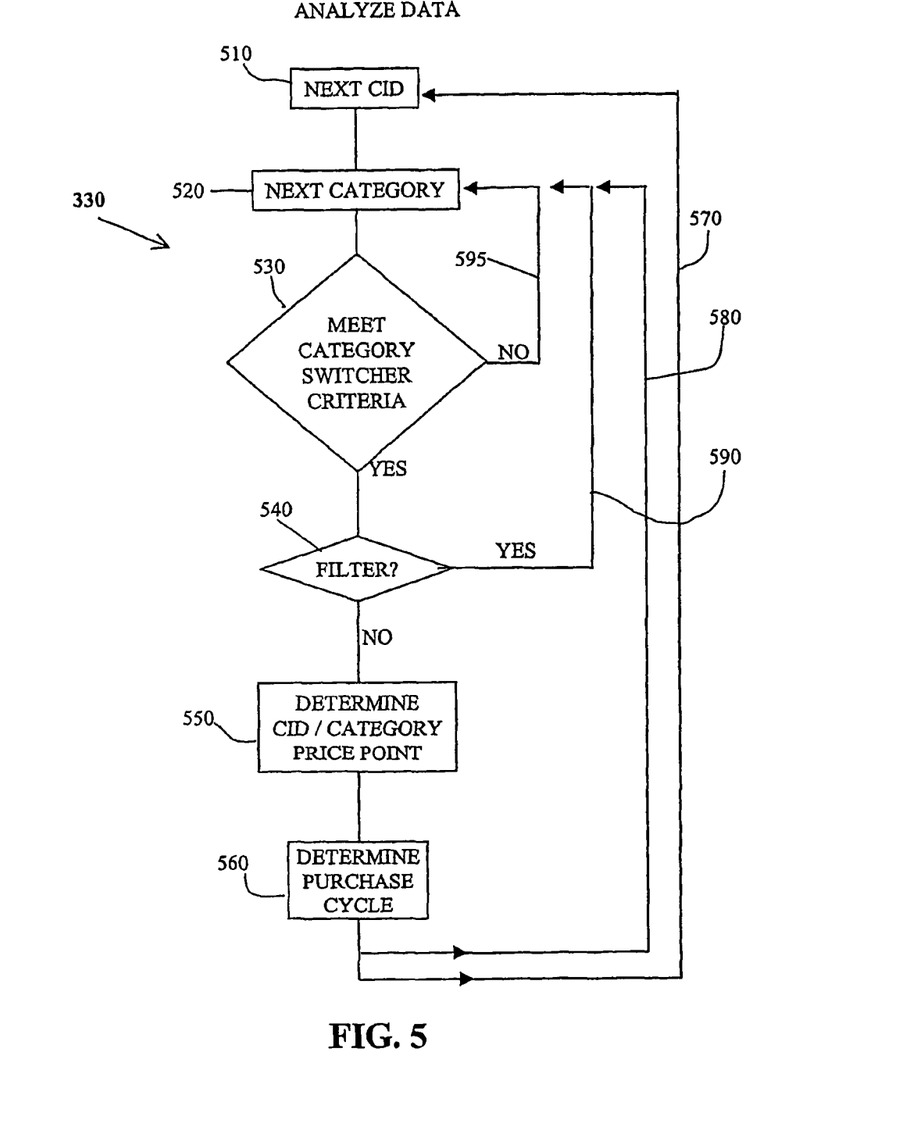
FIG. 5 is a medium level flowchart showing steps for analyzing transaction data for step 330 in FIG. 3.

FIG. 5 shows steps involved in analyzing data. In overview, FIG. 5 shows a flowchart including four nested loops. The outermost loop involves retrieving from memory the next customer ID. The intermediate loop involves retrieving from memory the next category. The two inner loops involve determining whether data associated with a CID indicates that the CID corresponds to category switcher purchase behavior and, if category switcher behavior exists, whether the purchase data meets filters indicating that the incentives for the associated CID should be price based.

In step 510, the central computer system 11 retrieves the next customer ID.

In step 520, the central computer system 11 receives the next product category.

In step 530, the central computer system determines whether the CID's transaction for products in the current category retrieved in step 520 meets category switcher criteria. If the CID's transaction data for that category does not meet category switcher criteria, the processing loops back to step 520 and retrieves the next category. If the CID's transaction data for that category does meet switcher criteria for that category, processing continues to step 540.

A client brand is defined herein to mean a brand of a manufacturer associated with an incentive program for execution by the central computer system 11.

A competitive brand of a specified category is defined herein to mean a brand of a product associated with that category made by other than the manufacturer of the client brand. Typically, the specified manufacturer is an entity requesting services from the entity owning the central computer system 11 disclosed herein. For example, the specific manufacturer may be a manufacturer requesting the owner of the central computer system 11 to perform a customer category specific price point marking program as disclosed in this application.

A dominant competitive brand in a specified category is defined herein to mean a brand, other than the client brand, for which there are associated with the current CID the most purchases (as measured either in number of units purchased or dollar value of purchases or number of times a shopper goes to a store and buys in the specified category, referred to herein as category trips) in the product category over a specified period of time. Preferably, that specified period of time is at least two months, more preferably at least six months and more preferably at least about one year. Preferably, that specified period of time extends up to the present time, or to within about one, two, or three weeks of the present time.

Step 530 involves the sub-steps of (1) determining the dominant competitive brand in the specified category for the current CID and (2) determining whether the CID's purchase behavior with respect to the dominant competitive brand and the client brand or brands meets category switcher criteria. The client brand may be specified. The central database 12 may store a table or file listing the product brands for each one of a plurality of product categories.

Preferably, the dominant competitive brand for the specified category is defined to be the brand of product other than the client brand for which either the largest number of units or the largest number of dollars of purchases exists in the transaction records associated with the current customer ID being analyzed in step 530. While the dominant competitive brand and the client brand definitions refer specifically to step 530, the method of analyzing the data need not be limited to algorithm specifically shown and discussed with respect to FIG. 5. For example, the loops retrieving CIDs and categories can be inverted without affecting the results of the analysis shown in FIG. 5.

In step 540, central computer system 11 determines whether the CID's transaction data meets certain filter criteria. If the CID's transaction data for the specified category does meet the filter criteria, processing returns to step 520 and the next category is retrieved.

Filter criteria are criteria indicating that providing to a customer holding a card storing the CID incentives based upon price point data would be ineffective, either because of lack of price point sensitivity or because the incentives would interfere with a sponsoring manufacturer's anticipated sales. Thus, one filter is criteria indicating lack of price sensitivity between the dominant competitive and client brands. Another filter is criteria indicating that the dominant competitive and client brands for the specified category are both made by the same manufacturer. That is, customer loyalty to a manufacturer for a specified category is a filter which returns processing from step 540 back to step 520 to retrieve the next category. Another filter is data showing the customer's tendency to purchase different brands in the same product category during the same purchase. This purchase behavior shows a lack of price point sensitivity. Purchasing in multiple brands for products in the same category during the same purchase transaction is a filter which returns processing from step 540 back to step 520 to retrieve the next category.

In step 540, if no filter criteria are met, processing proceeds to step 550.

In step 550, central computer system 11 determines the category specific price points between the dominant competitive and client brands for the CID and specified category. For example, the CID's transaction data in the hand soap category may indicate that the dominant competitive brand is Dial brand soap. The client brand may be Ivory brand soap. The CID's transaction data for the hand soap category may indicate that the customer purchases Dial soap whenever Dial soap is no more than 20 cents more expensive than Ivory soap, per 4 ounce bar of soap. In such an example, the price point is 20 cents favoring Dial over Ivory. Preferably, the period of time extends from the current time back from between a few months, preferably greater than six months, and preferably up to one year.

Price point determinations are preferably based upon price data for the dominant competitive and client brands in the specified category in a specified store at the time of each transaction being analyzed in step 530. Price data for all products is preferably obtained from the transaction records transmitted from the retail store to the central computer system 11. The data for the price of both the dominant competitive and the client brands in a specified store at a specified time may be determined by the central computer system 11 by reviewing data for additional customer records corresponding to purchases made in the corresponding retail store for both the dominant competitive and client brands. Alternatively, price data for all product brands sold in a store may be periodically or intermittently transmitted from each retailer computer system 14, 16, 18 to the central computer system 11. In addition, the central computer system 11 may use any of the foregoing sources of product price data at various times to predict product brand price variations and future prices in a specific retail store as a function of time.

In step 560, the central computer system 11 determines the category specific purchase cycle. For example, the central computer system 11 might determine that the CID associated with a specified customer and a specified retail store purchases hand bar soap most probably in the range of two to four weeks after the most recent prior purchase. In this example, the purchase cycle in the hand bar soap category for this specified customer ID would be set at between two and four weeks, preferably at three weeks.

Figure 6:
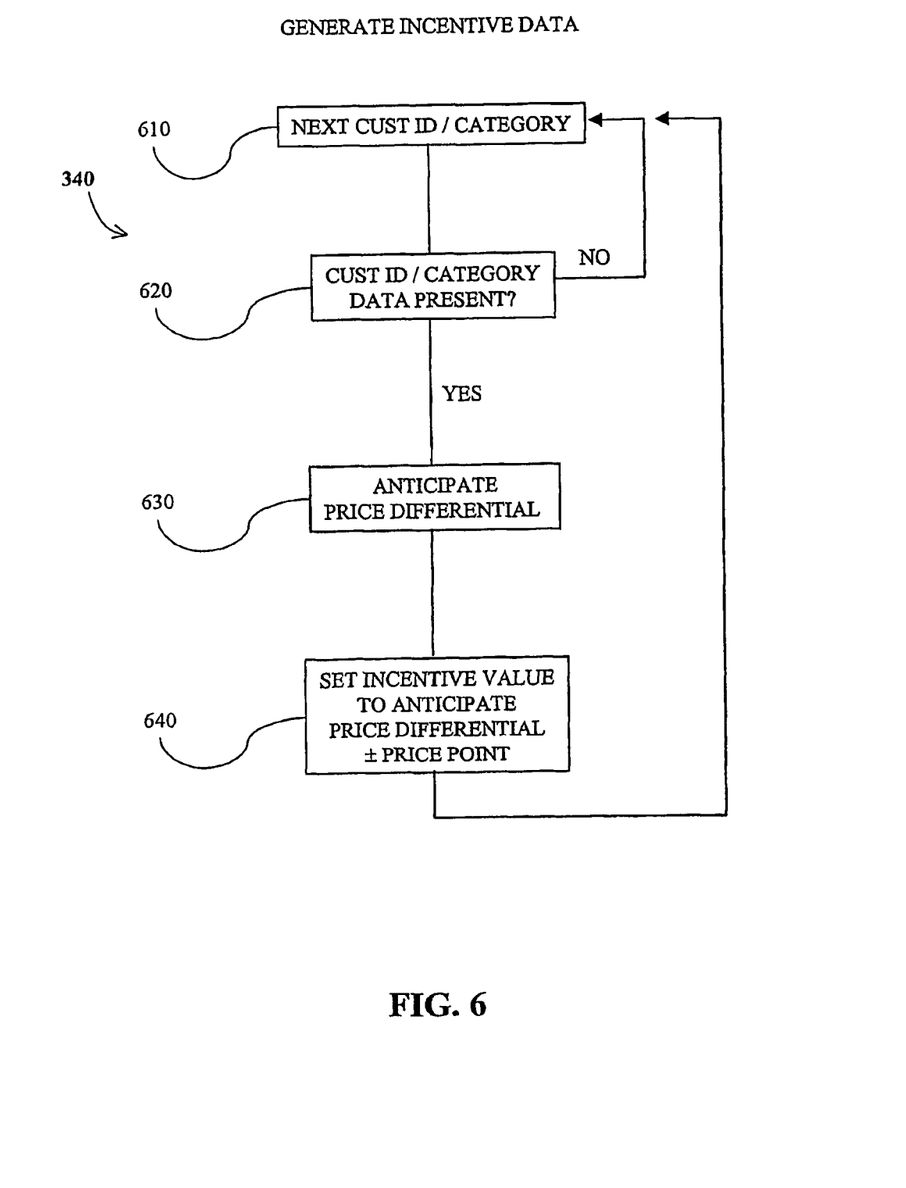
FIG. 6 is a medium level flowchart showing steps for generating incentive data for step 340 in FIG. 3.

FIG. 6 illustrates steps involved in the central computer system 11 in generating incentive data.

In step 610, the central computer system retrieves the next pair of CID and category.

In step 620, the central computer system 11 determines for the retrieved CID and category whether price point and purchase cycle data are present. If no price point and purchase cycle data is present, processing returns to step 610 to retrieve the next CID) and category combination. If price point and purchase cycle data exist for the current CID and product category, processing proceeds to step 630.

In step 630, the central computer system 11 anticipates the price differential between the dominant competitive and client brand in the specified category at a time indicated by the purchase cycle data when the customer associated with the current customer ID is likely to next purchase products in the specified category. The anticipation may of course be based upon the current or recent past price differential. The anticipation may be based upon interpolating using annual cyclical price variations, or by extrapolating based upon recent trends (less than one year) in prices. Extrapolation for example may employ linear regression analysis.

In step 640, the central computer system 11 determines an incentive value based upon the price differential anticipated in step 630 and the price point determined in step 550. The incentive is preferably a discount contingent upon purchase of the client brand during a specified period of time. In addition, in step 640, the central computer system may also determine when or during what period of time to offer the customer associated with the current specified CID the foregoing incentive. The price point based incentives for a category may be offered from the current time until the end of the calculated purchase cycle, at a time corresponding to a few days around the mid point of the category specific purchase cycle, or near the end of a category specific purchase cycle.

The incentive determined in step 640 may be offered to the customer either via transmission over the Internet to an address associated with the CID, such as the customer's email address, often associated with the customer computer 5, to a personal web page (i.e., a web site address for which the file associated therewith is programmed to display graphics or information preselected by the person associated with the CID) associated with a CID, to the retailer computer system 14, 16, or 18 associated with the retailer ID and customer ID, or to the manufacturer computer system 6. If the central computer system 11 transmits the incentive data to one of the retailer computer systems 14, 16, 18, then the retailer computer systems can provide the corresponding incentive to the customer associated with the CD when the customer next presents the CID at a POS terminal.

The invention also comprises a computer program product storing programming to implement the steps of the invention.

Obviously, numerous modifications and variations of the present invention are possible in light of the above teachings. It is therefore to be understood that within the scope of the appended claims, the invention may be practiced otherwise than as specifically described herein.

The invention claimed is:

1. A computer system for generating price point based incentive offers comprising: a computer system including computer memory, a digital processing unit, and an input/output device; and POS terminals of at least one retail store; wherein said computer system is configured so that said digital processor stores in a database in said computer memory transaction data for transactions recorded by said POS terminals of said at least one retail store; wherein said computer system is configured so that said digital processor stores in said database an association of a dominant competitive brand with a specified product or service category and a client brand with said specified product or service category; wherein said computer system is configured so that said digital processor determines from said transaction data a price differential between price of an item of said dominant competitive brand and price of an item of said client brand; wherein said computer system is configured so that said digital processor determines from at least said price differential, a category specific price point for said client brand; wherein said computer system is configured so that said digital processor determines from at least said category specific price point for said client brand, using said digital processor, an incentive value for an incentive offer for purchase of an item of said client brand; wherein said computer system is configured so that said digital processor determines from transactions in said transaction data associated with a CID of a customer, using said digital processor, a CID switcher determination indicating whether data associated with said CID meets a category switcher criteria; only if said CID switcher determination indicates transactions in said transaction data associated with said CID meet said category switcher criteria, using said digital processor, storing in said database said incentive offer in association with said CID; and a transmitter for transmitting from said computer system said incentive offer in association with said CID to an address associated with at least one of said CID and said at least one retail store, means for filtering to avoid associating said determines whether each CID for each product or service category meets category switcher criteria for that category.

* * * * *